United States Patent [19]

Lambie et al.

[11] Patent Number: 5,449,774

[45] Date of Patent: Sep. 12, 1995

[54] PRODUCTION OF BETA FORM PIGMENTARY COPPER PHTHALOCYANINE

[75] Inventors: Ian A. Lambie, Glasgow; Michael D. McFarlane, Paisley; Robert Langley, Glasgow, all of Scotland

[73] Assignee: Ciba-Geigy Corporation, Ardsley, N.Y.

[21] Appl. No.: 678,482

[22] Filed: Apr. 1, 1991

[30] Foreign Application Priority Data

Apr. 7, 1990 [GB] United Kingdom ............... 9007924

[51] Int. Cl.$^6$ .................... C09B 67/50; C09B 47/04
[52] U.S. Cl. ...................... 540/141; 540/140; 540/144; 106/200; 106/448
[58] Field of Search .................... 540/141, 44, 140

[56] References Cited

U.S. PATENT DOCUMENTS

| 3,188,318 | 6/1965 | Mack | 540/144 |
| 3,598,625 | 8/1971 | Buckwalter | 106/309 |
| 3,647,496 | 3/1972 | Bagal et al. | 106/309 |
| 4,158,572 | 6/1979 | Blackburn et al. | 106/288 |

FOREIGN PATENT DOCUMENTS

| 2017040 | 10/1970 | Germany . |
| 2439983 | 3/1976 | Germany . |
| 2745893 | 4/1978 | Germany . |
| 1490954 | 11/1977 | United Kingdom . |
| 1502884 | 3/1978 | United Kingdom . |
| 1541699 | 3/1979 | United Kingdom . |

OTHER PUBLICATIONS

"The phthaloeyanines" vol. II by Moser and Thomas, CRC Press Inc. (1983).

*Primary Examiner*—Jyothsna Venkat
*Attorney, Agent, or Firm*—JoAnn Villamizar; Michele A. Kovaleski

[57] ABSTRACT

The present invention provides a process for producing beta-form pigmentary copper phthalocyanine comprising a) producing crude copper phthalocyanine by charging phthalic anhydride or phthalimide, urea, a copper compound and a catalyst, at a substantially continuous and uniform rate, into a reaction chamber containing dry, granular, pre-formed copper phthalocyanine, and removing the reaction product from the reaction chamber; and b) convening the crude copper phthalocyanine produced in step a) into pigmentary form, by milling it either in the dry state or in an aqueous medium; mixing the milled material with an aqueous emulsion comprising i) a liquid $C_6$–$C_{20}$ amine which is insoluble in water or alkali but is soluble in acid and ii) a surfactant capable of emulsifying the liquid amine; rendering the resulting mixture acidic to thereby dissolve the amine; and finally separating the desired pigmentary copper phthalocyanine from the treatment mixture.

26 Claims, No Drawings

PRODUCTION OF BETA FORM PIGMENTARY COPPER PHTHALOCYANINE

The present invention relates to the production of pigments and, in particular, to a process for the production of beta copper phthalocyanine.

There are many processes which are known for the production of crude copper phthalocyanine. These processes usually use either phthalic anhydride or phthalonitrile as one essential starting material. One general method of producing crude copper phthalocyanine is by the so-called "bake" method in which phthalic anhydride, urea, copper chloride and a catalyst are 'baked' in ovens at 170°–210° C.

The other conventional method is the so-called 'solvent' method, in which the reactants are suspended in an organic liquid, e.g. nitrobenzene and are reacted at about 200° C.

Each general method has advantages and disadvantages and the pigment manufacturer chooses one method or the other depending on his particular circumstances.

In U.S. Pat. No. 3188318, there is described an improved 'bake' method of producing phthalocyanine compounds comprising reacting urea, a metal compound and an ortho-arylene derivative. One preferred metal compound is a copper salt and one preferred ortho-arylene compound is phthalic anhydride. The reactants are fed into a reaction chamber at a substantially continuous and uniform rate. The reaction chamber has an essentially oxygen-free atmosphere and contains an amount of dry, granular, previously formed phthalocyanine, equal to at least 2 hours of such feed. The reacted material is removed from the chamber substantially proportional to the rate of feed.

As already indicated, the product so obtained is in crude (non-pigmentary) form, and as such it must be converted into pigmentary form before it can be effectively used as a colourant in a final application medium, e.g. a printing ink or a plastics material.

As with the synthesis of crude copper phthalocyanine, there are many techniques available for the conversion of crude copper phthalocyanine into pigmentary form, e.g. by acid pasting to give 100% alpha form; salt-milling involving progressive conversion to the alpha form; salt milling with crystallizing material e.g. N,N-diethylaniline to give the beta form pigment; and salt kneading with inorganic salt and polar crystallizing material to give the beta pigmentary form.

We have now found that by combining a specific method of making crude copper phthalocyanine, with one particular method of converting the crude copper phthalocyanine so made into pigmentary material, this specific combination of process steps provides a pigment having unexpectedly superior pigmentary properties, in particular improved strength and gloss and green-shade properties.

Accordingly, the present invention provides a process for producing beta-form pigmentary copper phthalocyanine comprising a) producing crude copper phthalocyanine by charging phthalic anhydride or phthalimide, urea, a copper compound and a catalyst at a substantially continuous and uniform rate, into a reaction chamber containing dry, granular, pre-formed copper phthalocyanine, and removing the reaction product from the reaction chamber; and b) convening the crude copper phthalocyanine produced in step a) into pigmentary form, by milling it either in the dry state or in an aqueous medium; mixing the milled material with an aqueous emulsion comprising i) a liquid $C_6$–$C_{20}$ amine which is insoluble in water or alkali but is soluble in acid and ii) a surfactant capable of emulsifying the liquid amine; rendering the resulting mixture acidic to thereby dissolve the amine; and finally separating the desired pigmentary copper phthalocyanine from the treatment mixture.

The first step a) of the process of the invention is a modification of the conventional "bake" process.

Excess amounts of urea and copper compound over phthalic anhydride or phthalimide, are preferably used to produce the desired copper phthalocyanine product. In order to accelerate the reaction, a catalytic amount e.g. 0.1 to 1% by weight, based on the total weight of the reaction mixture, of ammonium molybdate is preferably present.

The dry, granular, preformed copper phthalocyanine, or 'heel' which is present in the reaction chamber, prior to charging the reactants, is maintained at an elevated temperature, preferably at a temperature within the range of from 150° C. to 300° C., especially from 160° C. to 200° C. The heel of preformed copper phthalocyanine is preferably maintained in a constant state of agitation during process step a). This state of agitation is conveniently achieved by rotating the reaction chamber viz by using rotatable reactor in order to perform step a) of the process. A convenient rate of rotation of the reaction chamber is one ranging from 5 to 10 rpm.

The copper compound reactant used may be any copper salt but cuprous chloride is preferred.

It is clearly important to control step a) of the process of the present invention by coordinating the rate of charging the reactants with the rate of discharge of crude copper phthalocyanine product. In a continuous process an hourly rate of discharge of a corresponding amount of finished phthalocyanine would be necessary to maintain the desired balance of raw materials and finished product in the reaction chamber.

The rate of charging of fresh reactants should be controlled to avoid caking of the agitated reaction mass, with consequent loss of desired particle size.

For batch or continuous processes, it is preferred that the proportion of total raw materials to preformed copper phthalocyanine in the reaction chamber, during the reaction period, ranges from 0.1 to 20%, preferably from 1 to 10% by weight based on the total weight of the preformed copper phthalocyanine.

In order to maximize yields of the desired copper phthalocyanine, and to minimise fire hazards, it is preferred that the reaction chamber is maintained substantially free of oxygen, e.g. by employing a nitrogen purge.

After completion of process step a), and prior to performing process step b) of the process of the present invention, it is preferred to purify the crude copper phthalocyanine, e.g. from reaction by-products, conveniently by contacting it with a dilute mineral acid, followed by filtration, and washing and optionally drying of the solid copper phthalocyanine product separated by the filtration step.

If the milling is effected by a dry technique, the milling may be performed in an apparatus such as a ball mill or a vibration mill. Dry milling may be performed in the total absence of a milling aid. Preferably, an additive may be present during the dry milling. This additive may function as a milling aid, as an improving agent for the subsequent amine/emulsion treatment or as an agent for improving the pigmentary performance of the final pigment product. Conveniently any additive used is present in amounts ranging from 5% to 15% by weight, based on the weight of the pigment being milled. Examples of suitable additives include sodium formate, phthalimide, phthalic anhydride, hydrogenated wood rosin or glycerol monooleate.

If the milling of the crude pigment is performed in an aqueous medium, the apparatus used is conveniently a bead mill, the crude pigment slurry being preferably preformed on a high speed mixer.

Any aqueous milling of the crude pigment may be effected e.g. in the presence of an amine emulsion; or by firstly effecting an aqueous milling with a subsequent milling in an aqueous amine emulsion.

Whether the milling operation is conducted under dry or aqueous conditions, the effect of the milling is to comminute the pigment particles and to progressively convert the copper phthalocyanine from the beta phase into the alpha modification. Desirably, the milling operation is terminated when the conversion into the alpha modification has reached a level of 20% to 85%, especially 50% to 75%. Alpha generation does not occur, however, when aqueous milling is performed in the presence of amine emulsion, or when subsequent milling in aqueous amine emulsion is carried out.

On completion of the milling operation, the milled product is mixed with an emulsion containing liquid $C_6$–$C_{20}$ amine and the surfactant, as hereinbefore defined.

The liquid amine may be, e.g. a mono-, di- or tri-amine and may be aliphatic or aromatic in nature. Examples of suitable aliphatic amines are $C_7$–$C_{16}$ alkyl mono-amines and aliphatic diamines having the formula $RNH.CH_2CH_2CH_2NH_2$ in which R is a $C_{12}$–$C_{16}$ aliphatic radical such as the tallow or coco (lauryl) radical. Arylamines include aniline and $C_1$–$C_4$ alkyl-substituted anilines such as o-toluidine, N,N-diethylaniline and N,N-dimethylaniline. The amount of amine used may vary within a wide range but is preferably from 2 to 50%, especially from 5 to 30% by weight, based on the weight of the pigment.

Any surfactant may be used provided that it is capable of emulsifying the liquid amine and has no detrimental effect on the pigmentary properties of the final pigment. The surfactant may be anionic, cationic or non-ionic in character.

Nonionic surfactants include alkylphenol-ethylene oxide condensates, e.g. nonylphenol ethylene oxide condensates comprising 7 moles of ethylene oxide per mole of condensate. Especially preferred are anionic surfactants including alkali metal salts of alkyl benzene sulphonates or resinates, especially sodium or potassium salt of dodecyl sulphonate or xylene sulphonate, tall oil unsaturated rosins, wood rosin or derivatives of wood rosin.

The amount of surfactant used is conveniently within the range of from 1 to 15% by weight, based on the weight of pigment.

The mixing of the milled material with the amine/surfactant emulsion is preferably effected at an elevated temperature, e.g. at a temperature within the range of from 20° C. to 100° C., especially from 40° C. to 70° C. and is performed for sufficient time that the pigment material attains an average particle size below 1 micron and is substantially in the beta modification.

After the material has attained the desired sub-micron particle size, the mixture is rendered acidic preferably by lowering the pH of the mixture to below 1.5 by adding mineral acid. The effect of acidifying the mixture is that the amine passes into solution as the amine salt, and if an alkali metal resinate is used as surfactant, such resinate is precipitated as the free resin. If an alkali metal resinate is used as surfactant, it is advantageous to add a salt which will break the solvent/surfactant emulsion before adding acid. Examples of such salts which may be added are barium chloride and zinc chloride, but calcium chloride is preferred. Formation of such a metal resinate before acidification can provide a pigment product having improved dispersibility.

After acidification, the pigment slurry may be filtered, washed with water until free of acid and chloride ions, and dried.

The pigment product obtained according to the process of the present invention exhibits excellent strength and gloss and desirable green-shade in oil ink systems. The pigment product so obtained is also useful as a colourant in publication gravure inks, in paints and in plastics. To enhance performance in publication gravure ink, paint or plastic systems, an additive, which may be a derivative of copper phthalocyanine may be added to the pigment product obtained according to the process of the present invention. Examples of such additives include dimethylaminomethyl copper phthalocyanine or phthalimidomethyl copper phthalocyanine in which the number of substituent groups on the copper phthalocyanine molecule ranges from 1 to 4, preferably from 2 to 3; sulphonated copper phthalocyanine; or amine salt of sulphonated copper phthalocyanine.

The following Examples further illustrate the present invention.

EXAMPLE 1

A mixture of 83.4 g of phthalic anhydride, 125.2 g urea, 16.3 g cuprous chloride and 0.5 g ammonium molybdate are fed at a rate of 106 g per hour into a cylindrical reactor containing 6000 g of the crude product as heel. The reactor contents are maintained at 175° C. and the reactor rotated at 6 rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and drying.

92 g of the aforesaid dry, purified copper phthalocyanine are ground in a ballmill with 8 g of sodium formate until the phase change gives an alpha content between 50–75%.

225 g of water at 50° C., 22.5 g 50% potassium hydroxide solution, 10 g hydrogenated wood rosin and 18.6 g of N, N-diethylaniline are stirred on a high speed mixer until an emulsion is obtained.

100 g of the ground copper phthalocyanine mixture described above and 300 g of water at 50° C. are added to the emulsion. The pigmented emulsion is stirred at 3000 rpm for 2 hours using a high speed mixer.

A solution of 5 g of calcium chloride in 75 g of water is then added, the slurry being stirred a further 30 minutes at 3000 rpm. Finally 55 g of 36% hydrochloric acid is added. The acidified pigment slurry is filtered, washed with water until the pigment is free of acid and chloride ions and the beta pigment filtercake dried at 80° C.

60 g of the pigment so obtained are mixed with 240 g of a typical quickset oil ink varnish and premixed for 15 minutes at 1000 rpm, temperature 60° C., using a Mastermix ® stirrer.

100 g of the premix are three roll milled on a Buhler SDY-200 ® 3 roll mill at 23° C.

1 st dispersion pass at 10 Bar

2nd dispersion pass at 10 Bar

Assessment of the properties is made by reducing the 1st pass ink (20% pigment) to 15% pigment with the above varnish and printing using a Prufbau ® printing machine to give prints with differing film weights. The print density for each print (at different film wt.) is measured (instrumentally) along with the gloss at equal film weight using an Erichsen Mini glossmaster ® at 60°.

The pigment when incorporated into the ink system according to the procedure described above, exhibits excellent properties with respect to strength, gloss and greenness of shade.

EXAMPLE 2

A mixture of 83.4 g of phthalic anhydride, 125.2 g urea, 16.3 g cuprous chloride and 0.5 g ammonium molybdate are fed at a rate of 106 g per hour into a cylindrical reactor containing 6000 g of the crude product as heel. The reactor contents are maintained at 175° C. and the reactor rotated at 6 rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and isolating as filtercake.

221 g of the aforesaid filtercake containing 167 g copper phthalocyanine is dispersed in 588 g water using a high speed mixer. The resulting dispersion is passed through a 0.3 liter capacity bead mill charged with 425 g 0.7-1 mm diameter glass beads, the agitators in the beadmill rotate at 3000 rpm. The dispersion is given sufficient passes until the phase change gives an alpha content of 50-75%.

175 g of water at 50° C., 20.4 g of 50% potassium hydroxide solution, 9 g hydrogenated wood rosin and 16.9 g of N, N-diethylaniline are stirred on a high speed mixer until an emulsion is obtained.

401.1 g of the beadmilled dispersion above equivalent to 82.8 g copper phthalocyanine, are added to the emulsion.

The pigmented emulsion is stirred at 6000 rpm for 1 hour.

A solution of 4.9 g of calcium chloride in 75 g of water is then added, the slurry is stirred a further 30 minutes at 6000 rpm. Finally 49 g of 36% hydrochloric acid is added. The acidified pigment slurry is filtered, washed with water until the pigment is free of acid and chloride ions and the beta pigment filtercake dried at 80° C.

20 g of the dried product are handmixed using a palette knife with 80 g of a typical quickset oil-ink varnish. When all the pigment is wetted out, the total is transferred to the rear nip of a Buhler SDY-200 ® 3 roll mill at 23° C. The mixture is mixed on the back rolls for 5 mins. at 10 Bar pressure then passed through the mill:

1st dispersion pass at 10 Bar

2nd dispersion pass at 10 Bar

Assessment of the properties is made in an identical manner to the method described in Example 1.

The pigment, when incorporated into the ink system according to the manner described above, exhibits excellent properties with respect to strength, gloss and greenness of shade.

EXAMPLE 3

A mixture of 83.4 g of phthalic anhydride, 125.2 g urea, 16.3 g cuprous chloride and 0.5 g ammonium molybdate are fed at a rate of 106 g per hour into a cylindrical reactor containing 6000 g of the crude product as heel. The reactor contents are maintained at 175° C. and the reactor rotated at 6rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and drying.

105 g of the aforesaid dry, purified copper phthalocyanine are ground in a ballmill until the phase change gives an alpha content between 50–75%.

225 g of water at 50° C., 22.5 g 50% potassium hydroxide solution, 10 g hydrogenated wood rosin and 18.6 g of N,N-diethylaniline are stirred on a high speed mixer until an emulsion is obtained.

100 g of the ground copper phthalocyanine mixture described above and 300 g of water at 50° C. are added to the emulsion. The pigmented emulsion is stirred at 3000 rpm for 2 hours using a high speed mixer.

A solution of 5 g of calcium chloride in 75 g of water is then added, the slurry is stirred a further 30 minutes at 3000 rpm. Finally 55 g of 36% hydrochloric acid are added. The acidified pigment slurry is filtered, washed with water until the pigment is free of acid and chloride ions and the beta pigment filtercake dried at 80° C.

22.5 g of the dried product are mixed with 127.5 g of a typical quickset oil ink varnish and premixed for 15 minutes at 1000 rpm, temperature 60° C., using a Mastermix stirrer ®

200 g of 1 mm diameter glass beads are then added and the mixture bead milled for a further 15 minutes at 2,600 rpm, temperature 80° C.

Assessment of the properties is made by printing the full shade ink using a Prufbau printing machine to give prints with differing film weights. The print density for each print (at different film weight) is measured instrumentally along with the gloss using an Erichsen Mini glossmaster ® at 60°.

The product shows excellent strength, gloss and green shade.

EXAMPLE 4

A mixture of 83.4 g of phthalic anhydride, 125.2 g urea, 16.3 g cuprous chloride and 0.5 g ammonium molybdate is fed at a rate of 106 g per hour into a cylindrical reactor containing 6000 g of the crude product as heel. The reactor contents are maintained at 175° C. and the reactor rotated at 6rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and drying.

105 g of the aforesaid dry, purified copper phthalocyanine are ground in a ballmill until the phase change gives an alpha content of 50–75%.

200 g of water of 50° C., 1.66 g of nonyl phenol ethylene oxide condensate (10 mols. ethylene oxide) and 10.3 g of the diamine R—NH—$(CH_2)_3NH_2$, where R is the coco derivative (lauryl), are stirred on a high speed mixer until an emulsion is obtained.

87.1 g of the aforesaid ground copper phthalocyanine and 250 g of water at 50° C. are added to the emulsion. The pigmented emulsion is stirred for 90 minutes at 3000 rpm using a high speed mixer.

29.5 g of 36% hydrochloric acid are added and the acidified pigment slurry is filtered, washed with water until the pigment is free of acid and chloride ions and the pigment filtercake is dried at 70° C.

12 g of the dried product are mixed with 48 g of a 50% solution of a phenolic resin in toluene and 40 g of toluene in a 453 g jar.

200 g of 10 mm diameter steatite balls are added and the mixture dispersed for 16 hours.

The ink so produced shows excellent strength, gloss and green shade properties.

EXAMPLE 5

A mixture of 83.4 g of phthalic anhydride, 125.2 g urea, 16.3 g cuprous chloride and 0.5 g ammonium molybdate is fed at a rate of 106 g per hour into a cylindrical reactor containing 6000 g of the crude product as heel. The reactor contents are maintained at 175° C. and the reactor rotated at 6rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and drying.

93.2 g of the aforesaid dry, purified copper phthalocyanine and 6.8 g of sodium formate are ground in a ballmill until the phase change gives an alpha content of 50–60%.

200 g of water 50° C., 23 g of N,N-diethylaniline and 4.1 g of dodecylbenzene sulphonic acid are stirred on a high speed mixer until an emulsion is obtained.

93.4 g of the ground copper phthalocyanine mixture described above and 270 g of water at 55° C. are added to the emulsion. The pigmented emulsion is stirred at 3000 rpm for 2 hours using a high speed mixer.

29.5 g of 36% hydrochloric acid are added and the acidified pigment slurry is filtered, washed with water until free of acid and chloride ions and the pigment filtercake dried at 70° C.

The dried product is incorporated into a PVC plastics system where it exhibits excellent strength and green shade.

EXAMPLE 6

A mixture of 83.4 g of phthalic anhydride, 125.2 g urea, 16.3 g cuprous chloride and 0.5 g ammonium molybdate are fed at a rate of 106 g per hour into a cylindrical reactor containing 6000 g of the crude product as heel. The reactor contents are maintained at 175° C. and the reactor rotated at 6 rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and drying.

102 g of the aforesaid dry, purified copper phthalocyanine and 4.8 g of phthalimide are ground in a ball mill until the phase change gives an alpha content of 50–75%. 250 g of water at 70° C., 13.5 g of hydrogenated wood rosin, 30.3 g of 50% potassium hydroxide solution and 7.4 g of an aliphatic amine $RNH_2$, where R is the coco derivative (lauryl), are high speed stirred until an emulsion is obtained.

91.3 g of the ground copper phthalocyanine mixture described above and 270 g of water at 70° C. are added to the emulsion. The pigmented emulsion is stirred for 2 hours at 3000 rpm using a high speed mixer.

A solution of 7.4 g of calcium chloride in 100 g of water at 70° C. is then added, the slurry is stirred a further 30 minutes at 3000 rpm. Finally 64.9 g of 36% hydrochloric acid is added. The acidified pigment slurry is filtered washed with water until the pigment is free of acid and chloride ions and the pigment filtercake dried at 80° C.

The resulting dry pigment is incorporated into a alkyd/melamine stoving paint system where it exhibits excellent gloss, strength and green shade.

EXAMPLE 7

A mixture of 83.4 g of phthalic anhydride, 125.2 g urea, 16.3 g cuprous chloride and 0.5 g ammonium molybdate are fed at a rate of 106 g per hour into a cylindrical reactor containing 6000 g of the crude product as heel. The reactor contents are maintained at 175° C. and the reactor rotated at 6 rpm. The reaction chamber is maintained substantially free of oxygen by employing a nitrogen purge.

The crude product is discharged as a dry granular material.

The crude product is purified by stirring in 10% aqueous hydrochloric acid at 95° C., followed by filtration, washing and drying.

93.2 g of the aforesaid dry, purified copper phthalocyanine and 6.8 g of sodium formate are ground in a ballmill until the phase change gives an alpha content of 50–60%.

225 g of water at 50° C., 22.5 g 50% potassium hydroxide solution, 10 g hydrogenated wood rosin and 18.6 g of N,N-diethylaniline are stirred on a high speed mixer until an emulsion is obtained.

100 g of the ground copper phthalocyanine mixture described above and 300 g of water are added to the emulsion. The pigmented emulsion is stirred at 3000 rpm for 2 hours using a high speed mixer.

A solution of 5 g of calcium chloride in 75 g of water is then added, the slurry is stirred at 3000 rpm for 25 minutes. A slurry of 2.8 g of dimethylaminomethyl copper phthalocyanine in 70 g of water is then added and the mixture stirred a further 5 minutes at 3000 rpm.

Finally 55 g of 36% hydrochloric acid are added. The acidified pigment slurry is filtered, washed with water until the pigment is free of acid and chloride ions and the beta pigment filtercake dried at 80° C.

The pigment produced is dispersed into a phenolic resin/toluene gravure ink formulation where it exhibits excellent strength, gloss and green shade properties.

We claim:

1. A process for producing beta form pigmentary copper phthalocyanine comprising a) producing crude copper phthalocyanine by charging phthalic anhydride or phthalimide, urea and a copper salt, at a substantially continuous and uniform rate, into a reaction chamber containing dry, granular, pre-formed copper phthalocyanine, and removing the reaction product from the reaction chamber; and b) converting the crude copper phthalocyanine produced in step a) into pigmentary form, by milling it either in the dry state or in an aqueous medium; mixing the milled material with an aqueous emulsion comprising i) a liquid $C_6$–$C_{20}$ amine which is insoluble in water or alkali but is soluble in acid and ii) a anionic or nonionic surfactant capable of emulsifying the liquid amine and having no detrimental effect on the final pigment properties; rendering the resulting mixture acidic to thereby to dissolve the amine; and finally separating the desired pigmentary copper phthalocyanine from the treatment mixture.

2. A process according to claim 1 in which excess amounts of urea and copper compound over the phthalic anhydride or phthalimide, are used to produce the desired copper phthalocyanine.

3. A process according to claim 1 in which a catalytic amount of ammonium molybdate is present in step a).

4. A process according to claim 1 in which the dry, granular, preformed copper phthalocyanine is maintained at a temperature in the range of from 150° C. to 300° C.

5. A process according to claim 1 in which the dry, granular, preformed copper phthalocyanine is maintained in a constant state of agitation during process step a).

6. A process according to claim 5 in which the reaction chamber is rotatable and is rotated during step a).

7. A process according to claim 1 in which an oxygen-free atmosphere is maintained in the reaction chamber.

8. A process according to claim 1 in which the copper compound is cuprous chloride.

9. A process according to claim 1 in which the proportion of total raw materials to preformed copper phthalocyanine in the reaction chamber, during the reaction period, ranges from 0.1 to 20% by weight, based on the total weight of the preformed copper phthalocyanine.

10. A process according to claim 1 further comprising purifying the crude copper phthalocyanine after completion of step a) and prior to performing step b).

11. A process according to claim 1 in which, in step b), the milling is effected in the total absence of a milling aid.

12. A process according to claim 1 in which the milling is performed in a ball mill or vibration mill.

13. A process according to claim 1 in which a milling aid additive, or an improving agent for the subsequent amine/emulsion treatment, is present during the milling stage.

14. A process according to claim 13 in which the amount of the additive ranges from 5% to 15% by weight, based on the weight of the pigment being milled.

15. A process according to claim 13 in which the additive is phthalimide, phthalic anhydride, hydrogenated wood rosin, glycerol monooleate or sodium formate.

16. A process according to claim 1 in which the milling of the crude pigment in step b) is performed in an aqueous medium using a bead mill.

17. A process according to claim 1 in which the milling operation in step b) is terminated when the degree of conversion of the copper phthalocyanine into the alpha modification reaches 20 to 85%.

18. A process according to claim 16 in which the aqueous milling is effected in the presence of an amine emulsion, or by firstly effecting an aqueous milling, with a subsequent milling in an aqueous amine emulsion.

19. A process according to claim 1 in which the liquid amine is a $C_7$–$C_{16}$ alkyl monoamine; an aliphatic diamine of formula $RHN(CH_2)_3NH_2$ in which R is a $C_{12}$–$C_{16}$ aliphatic radical; aniline; or a $C_1$–$C_4$ alkyl substituted aniline.

20. A process according to claim 1 in which the amount of amine used ranges from 5 to 30% by weight, based on the weight of the pigment.

21. A process according to claim 1 in which the surfactant used in step b) is an anionic surfactant which is an alkali metal salt of an alkylbenzene sulphonate, a tall oil unsaturated rosin, wood rosin or derivative of wood rosin.

22. A process according to claim 1 in which the surfactant is a nonionic surfactant and is an alkylphenolethylene oxide condensate.

23. A process according to claim 1 in which the amount of surfactant used is from 1 to 15% by weight, based on the weight of the pigment.

24. A process according to claim 1 in which, in step b), the mixing of the milled material with the amine/surfactant emulsion is performed at 20° to 100° C. and for sufficient time that the pigment material attains an average particle size below 1 micron and is substantially in the beta modification.

25. A process according to claim 1 wherein the mixture of step b) is rendered acidic by lowering the pH value of the mixture to a value below to 1.5 by adding mineral acid.

26. A process according to claim 21 in which an alkali metal resinate is used as the anionic surfactant and a salt is added to break the solvent/surfactant emulsion, prior to acidification.

* * * * *